United States Patent [19]

Huber et al.

[11] Patent Number: 5,677,370
[45] Date of Patent: Oct. 14, 1997

[54] CERAMIC COLOR PASTE AND PRINTING MEDIUM THEREFOR

[75] Inventors: Adalbert Huber, Langen; Silke Schäfer, Frankfurt am Main, both of Germany

[73] Assignee: Cerdec AG Keramische Farben, Frankfurt am Main, Germany

[21] Appl. No.: 670,234

[22] Filed: Jun. 17, 1996

Related U.S. Application Data

[63] Continuation of Ser. No. 158,296, Nov. 29, 1993, abandoned.

[30] Foreign Application Priority Data

Nov. 27, 1992 [DE] Germany ............................ 4 239 862.2

[51] Int. Cl.$^6$ ........................................................ C08K 5/01
[52] U.S. Cl. ......................... 524/490; 524/491; 524/538; 524/539; 524/306
[58] Field of Search ................................. 524/490, 491, 524/306, 538, 539

[56] References Cited

U.S. PATENT DOCUMENTS

| | | | |
|---|---|---|---|
| 4,388,427 | 6/1983 | Nishikawa et al. | 523/500 |
| 4,472,537 | 9/1984 | Johnson et al. | 523/160 |
| 5,132,165 | 7/1992 | Blanco | 428/210 |

FOREIGN PATENT DOCUMENTS

| | | |
|---|---|---|
| 0 105 944 | 4/1984 | European Pat. Off. . |
| 59133275 | 1/1983 | Japan . |
| 59-133275 | 2/1984 | Japan . |
| 63205287 | 2/1987 | Japan . |
| 63-205287 | 8/1988 | Japan . |

*Primary Examiner*—Paul R. Michl
*Assistant Examiner*—John J. Guarriello
*Attorney, Agent, or Firm*—Wenderoth, Lind & Ponack

[57] ABSTRACT

The invention relates to a ceramic color paste, in particular a color paste containing alkyd resins, for the production of decorations on surfaces of glass, porcelain or ceramic, and a printing medium for the preparation of the color paste.

Known generic color pastes and printing media for producing the same generally have an intense odor and tend to form a skin if an alkyd resin is present.

The invention overcomes these disadvantages by the solvent system of the printing medium of the color paste containing substantially at least 50 to 100% by weight, preferably above 70% by weight, of one or more isoparaffins and from 0 to 50% by weight, preferably from 0 to 30% by weight, of one or more solvating plasticisers. Skin formation is prevented by the presence of an aldoxime or ketoxime containing 3 to 6 carbon atoms or an anti-oxidant for polymer systems.

6 Claims, No Drawings

CERAMIC COLOR PASTE AND PRINTING MEDIUM THEREFOR

This application is a continuation of now abandoned application Ser. No. 08/158,296, filed Nov. 29, 1993.

The invention relates to a colour paste, in particular a colour paste containing alkyd resins, for the production of decorations on surfaces of glass, porcelain or ceramic and to a printing medium for the production of the colour paste. The colour paste and the printing medium therefor are distinguished by their relative freedom from odour, increased storage stability and reduced tendency to faults in stoving. The decoration, which is produced by conventional decorating processes such as screen printing or transfer printing using the colour paste according to the invention, is fixed by stoving in the conventional manner.

Ceramic colour pastes are used for decorating ceramic surfaces, in particular surfaces of porcelain, ceramic or glass. The desired decoration is applied to the ceramic surface by conventional decorating techniques, using such colour pastes, in particular by direct or indirect printing processes, and stoved in known manner, in most cases at temperatures in the region of 500° to 1400° C.

The paste is typically composed of colour producing inorganic components such as inorganic pigments or colour frits, in most cases a glass flux and the medium, which is composed mainly of binders, solvents and various processing auxiliaries. The glass flux serves to fix the colour producing components to the ceramic surface; the binder and solvent form a viscous medium which together with the colour producing components and the flux produce a printable paste.

Direct application of the colour pastes is usually carried out by screen printing: For automobile glasses in particular, very large surface screens with low throughputs of colour paste are used in air conditioned halls. After printing, the solvent is removed by a drying process and the decorated article thus obtained is put into a stoving oven in which organic components of the colour paste are burnt and glazing components are melted. Indirect application of the colour paste is in most cases carried out by means of transfers. To produce these, the colour paste, which in this case need not contain a glass flux (see e.g. GB 2 245 221 A), is printed on a carrier material, in most cases paper, which is provided with a separating layer and may already carry a support layer containing a glass flux, and if required a covering layer may then be applied to the whole arrangement, for a example a film containing a binder. After the carrier has been removed (by dissolving the separating layer in water or by melting it if it consists of waxes), the picture is transferred to the article to be decorated and is stoved.

In practice, the printing medium of ceramic colour pastes frequently contains pine oils, terpineol and other compounds on a terpene basis as the main component of the solvent system. Other solvents include aromatic solvents, alcohols, chlorinated hydrocarbons, ketones, esters and light petrol (see e.g. GB 2 245 221 A; DE-OS 25 06 820). The terpene-based solvents are highly malodrous, are classed as irritants and, being naturally occurring substances, are not always available in the same quality. The disadvantages of the aromatic solvents used are that some have low MAK values (=maximale Arbeitsplatzkonzentration=maximum work place concentration) and that they have poor drying characteristics which tend to give rise to stoving faults. Some glycol ethers are irritant and have an intense odour while chlorinated hydrocarbons are undesirable from an ecotoxicological point of view; light petrols are relatively odourless but owing to their low flash point their use is limited for safety reasons; esters, ketones and alcohols have a more or less strong odour and do not meet all the requirements for technical application. The printing media hitherto used in colour pastes can only be used in a mixing ratio of ceramic colour (=pigments and glass flux) to medium of about 3:1 on account of the binder-solvent combination, even in the case of pastes used for plane glass coatings; the result is frequently insufficient covering power.

In DE-OS 25 08 820, pastes which have been prepared from monohydric or polyhydric alcohols and higher aliphatic and aromatic hydrocarbons are described as unsatisfactory on account of their insufficient resistance to wiping. These pastes, however, contained no binder. The mixing ratio of ceramic colour to medium is given in the said document as ranging from 1:1 to 7:3 and is thus not very satisfactory if the pastes are required to be well covering.

For cleaning the screens, the same solvents as those contained in the printing medium are preferably used but this gives rise to the problems already listed above. Cleaning of the screens is particularly problematic as some screens measure several $m^2$ and unpleasant odours and skin irritations are unavoidable in spite of suitable protective measures.

Lastly, ceramic colour pastes which contain alkyd resins as binders have the unpleasant characteristic of forming a skin in contact with air. This gives rise to problems in screen printing, increased rejects of decorated articles, increased consumption of paste and increased effort for cleaning the screens.

It is thus an object of the present invention to provide ceramic colour pastes which are substantially odourless and give rise to no problems in processing from the point of view of work hygiene and safety. The printing medium used in the colour pastes should also enable screen printable pastes to be produced which have a solids content above 70% by weight, in particular above 75% by weight, so as to render them more economical by reducing the quantity of solvent and produce highly covering decorations even if the ceramic colour pastes contain a glass flux. It is a further object of the invention to provide substantially odourless colour pastes which contain alkyd resins but have a reduced tendency to skin formation and a suitable printing medium for such pastes.

A colour paste has now been found for the production of decorations on surfaces of glass, porcelain or ceramic, containing (a) one or more colour producing inorganic components selected from stoving stable pigments and colour frits and (b) a printing medium in which one or more polymeric organic binders are dissolved as clear solutions or as gel in an organic solvent system, characterized in that the solvent system contains at least 50 to 100% by weight of one or more isoparaffins boiling in the range of from 115° to 300° C., from 0 to 50% by weight of one or more solvating plasticisers and from 0 to 30% by weight of one or more solvents selected from alcohols, ethers, esters and ketones.

The colour frits according to the invention preferably contain a glass flux to fix the decoration to the ceramic surface of the carrier during stoving. Colour pastes for direct printing would generally contain a glass flux but glass flux may be omitted for the production of transfers under certain conditions, e.g. those described in GB 2 245 221 A. A screen printable paste would however, in most cases also contain a glass frit when used for the production of transfer pictures.

Preferred colour pastes consist of a glass flux, colour producing inorganic components, a printing medium and conventional processing auxiliaries. The printing medum is present in a quantity of from 10 to 45% by weight, preferably from 15 to 25% by weight and in particular from 15 to 20% by weight. The proportion of processing auxiliaries is generally from 0 to 10% by weight, in most cases from 0 to 5% by weight. The ratio by weight of colour producing components to glass flux in the preferred colour pastes which contain glass flux is in most cases from 1:10 to 5:1. Mixing ratios outside this range are possible and the man of the art will adjust the ratio according to the desired colour properties and properties required of the decorated ceramic article in use.

The solvent system contains at least 50% by weight, preferably more than 70% by weight, of isoparaffins claimed for this invention. Isoparaffins boiling in the range from above 150° up to 260° C. are preferred. Synthetically produced isoparaffin mixtures of consistent quality are generally used. The isoparaffins contained in the colour pastes are virtually odourless and classified as non-irritant (MAK value 300 ppm): the ventilating time and drying time can easily be adjusted since the isoparaffins are available in the required boiling ranges. Ordinary commercial isoparaffins generally contain less than 1% by weight of aromatic components. As is well known, isoparaffins are regarded as apolar solvents with little dissolving power for highly polar monomeric substances or polymeric substances containing a high proportion of polar groups. Although it was already known (Company publication TBF-03/88 of Krahn Chemie GmbH, Hamburg re "Plioway" resins of Goodyear) that certain acrylic resins dissolve as gels in isoparaffins and that such solutions may be used for odourless, environmentally friendly paints and lacquers, it was not foreseeable that such isoparaffins could also be used as the main components of the solvent system of the printing medium for screen printable ceramic colour pastes which have a high solids content, preferably above 70%.

To improve the solvent properties of the solvent system, the latter may contain up to 50% by weight, preferably up to 30 by weight and in particular from 5 to 20% by weight, of solvating plasticisers. By "solvating" is meant that the plasticisers form clear solutions in the solvent system which consists predominantly of isoparaffins. The higher polarity of the plasticisers compared with that of isoparaffins then has a positive effect on the dissolving power of the solvent system for polymeric binders; as a result, the choice of binders can be increased and adjusted to the different technical requirements of ceramic colour pastes in use. The usual classes of plasticisers may be used, provided they are sufficiently soluble in isoparaffins and are free from chlorine and relatively odourless; for example, substances selected from phthalates such as dioctyl phthalate, esters of $\alpha,\omega$-($C_6$–$C_{12}$)-dicarboxylic acids such as adipates, sebacates and diisobutyrates, and phosphates such as tricresyl phosphate. The man of the art will carry out preliminary experiments to ascertain the suitability of the given plasticiser or plasticisers which, of course, must not adversely affect the stoving process.

Small quantities, namely up to 30% by weight, preferably up to 10% by weight and in particular less than 5% by weight, of conventional solvents such as those used for the production of lacquers and paints may also be present as cosolvents in the solvent system. These may be alcohols such as diisobutyl carbinol or dipropyl glycol, ethers, esters such as glycolic acid butyl ester or lactic acid esters, ketones or aromatic or cycloaliphatic hydrocarbons but on condition that they cause no significant increase in odour. Particularly preferred colour pastes substantially contain only plasticisers and isoparaffins claimed for the invention as components of the solvent system.

The binder system of the printing medium may consist of one or more polymers. The binders may also include combinations of prepolymers and thermosetting hardening components but hardening-free polymers selected from polymers and polycondensates are preferred. The binder or binders to be used in the printing medium of the colour paste is/are characterized by low polarity; they must be so chosen that they dissolve in the solvent system as clear solutions or at least as gels. The proportion of binder in the printing medium is generally in the range of 1 to 60% by weight, in most cases from 5 to 35% by weight, in particular from 10 to 30% by weight.

The polymers may be homo- or copolymers of low polarity monomers such as ($C_3$–$C_{12}$)-alkyl methacrylate or ($C_3$–$C_{12}$)-alkyl acrylate such as, for example, 2-ethylhexylacrylate, styrene, vinyl toluene or 2-ethyl-hexene. The homo- and copolymers are preferably based on n- and iso-butyl methacrylate and propyl and butyl acrylate as main component. Polymethyl methacrylate is unsuitable; copolymers may only contain a small proportion of methyl methacrylate. Polymers which are only slightly cross-linked and dissolve in the form of gels may also be used, e.g. so called vinyl acrylate terpolymers. Further examples of binders include polyolefins such as polyisobutenes, cyclorubber resins and hydrocarbon resins. Modified alkyd resins are also suitable, provided the modification reduces the polarity in such a manner that the resins are soluble in the solvent system.

It has been found advantageous to use a binder system which consists substantially of the above mentioned methacrylic or acrylic polymers and copolymers selected from the above mentioned polyolefins, cyclorubber resins, hydrocarbon resins and modified alkyd resins, as these are compatible and soluble in the solvent system. Combinations of acrylic or methacrylic polymers or copolymers and modified alkyd resins are preferred.

Effective quantities of various conventional processing auxiliaries may be present to improve certain properties of the colour paste or of the printing medium contained therein. The individual additives may generally be present in a quantity of from 0.01 to 5% by weight; the total quantity of these substances would generally not exceed 10% by weight and would preferably not exceed 5% by weight, based on the colour paste. The following auxiliaries are frequently present: wetting and dispersing agents, e.g. soya lecithin; defoamers and levelling agents, e.g. silicone compounds; and additives for controlling the flow properties of the colour paste, including pyrogenic silicas, bentonites, various types of castor oil, and polyethylene waxes.

Ceramic colour pastes of the type according to the invention which contain modified alkyd resins have excellent use properties but the disadvantage that they form a skin when left to stand in air. This skin formation impairs the storage stability of the colour paste and of the printing medium used for the preparation of the colour paste. Skin formation also makes cleaning of the screens more difficult when such a colour paste is used for the screen printing technique. It has been found that ketoximes and aldoximes, especially those containing 3 to 6 and preferably 4 carbon atoms, in other words 1- and 2-butanoneoxime, are very efficient antiskinning agents in the colour pastes according to the invention. Antioxidants, whose action is based on various mechanisms—see Polymer Degradation & Stabilisation, ed. by N. Grassie and G. Scott, pages 119 to 135—may also be used as antiskinning agents. The following classes of antioxidants are given as examples:

Phosphites such as tris-nonylphenyl phosphite; sulphidic compounds such as thiodipropionate or 4-hydroxy-3,5-ditert.-butyl-phenylamino-bis-octylmercapto-s-triazine; diphenylamines such as N-isopropyl-N'-phenyl-p-phenylenediamines; sterically hindered phenols such as 3,5-di-tert.-butyl-4-hydroxytoluene and numerous other compounds containing one or more tert.-alkylated phenol radicals; chelating compounds for metal inactivation, such as disalicydiene-ethylenediamine and 2-hydroxy-methyl-acetophenoneoxime. The quantity used is generally in the range of from 0.005 to 2% by weight, in particular from 0.05 to 0.5% by weight, based on the colour paste.

Although the problem of skin formation occurs mainly in the colour paste because the heavy metals in the pigments and frits are particularly active in catalysing the auto-oxidation of the binder, hence causing skin formation, the antiskinning agent should already be added to the printing medium. In view of the high solids content of the colour paste and hence large proportion of heavy metals which catalyse skin formation, it was not foreseeable that the above mentioned oximes and antioxidants would prevent skin formation over a prolonged period.

The invention further relates to the printing medium suitable for the preparation of the above described colour pastes containing alkyd resins. The printing medium is characterized in that the solvent system mainly contains at least 50 to 100% by weight of one or more isoparaffins having a boiling point in the range of from 115° to 300° C., from 0 to 50% by weight of one or more solvating plasticisers and from 0 to 30% by weight of one or more solvents selected from alcohols, ethers, esters and ketones and in that the binder system mainly contains one or more modified alkyd resins and one or more homo- and/or copolymers of, mainly, ($C_3$–$C_{12}$)-alkyl methacrylates and/or ($C_3$–$C_{12}$)-alkyl acrylates, and an effective quantity of antiskinning agent selected from ketoximes and aldoximes containing 3 to 5 carbon atoms and conventional antioxidants for polymer systems is present in addition.

The colour producing inorganic components in the colour pastes may be so called colour frits, i.e. fritted glasses containing colour producing metal oxides and/or inorganic pigments known in the art, provided they are sufficiently stable to stoving. Examples of colour frits include in particular lead borosilicate glasses containing CuO, CoO, MnO, $Fe_2O_3$. Examples of pigments include oxides of the elements Cr, Mn, Fe, Co, Ni, Cu and Cd and their mixed oxides with $Al_2O_3$, $TiO_2$, ZnO, $SnO_2$, e.g. spinels and titanates; also, sulphides and selenides of Cd, in particular in the form of glazing stable inclusion pigments.

The term "glass flux" is used mainly to denote glass frits which melt at the stoving temperature. Preferred glass frits have a low melting point, e.g. in the region of 450° to 800° C. The melting point and hence the choice of glass depends on the article to be decorated. Borosilicate glasses containing one or more oxides of Li, Na, K, Mg, Ca, Al, Ti, Zr, Sn, Pb, Cd, Sb, Bi are customarily used. A glass flux may also be a combination of $SiO_2$ or silicates and $B_2O_3$ with one or more of the above mentioned oxides and fluxes such as fluorides, provided that glass formation is possible under the stoving conditions.

Production of the colour pastes is carried out in known manner: the printing medium is first produced by dissolving the binder or binders in the solvent system or components thereof, generally at a moderately elevated temperature. The colour producing components and the glass flux are then added and dispersed in an intensive mixing apparatus, e.g. a three roll mill, and homogenised. Processing auxiliaries may be added directly to the printing medium or subsequently to the colour paste. The printing viscosity of the paste is adjusted if necessary by the addition of components of the solvent system of the printing medium.

One major advantage of the colour paste according to the invention and of the special printing medium therefor is the relative freedom from odour and hence improved work hygiene. The solvent system which characterizes the colour pastes gives rise to pastes suitable for screen printing which may have very high solids contents. It was not to be expected that isoparaffins, which are solvents with a very low dissolving power, could be used as the only or at least the main solvent component in technically high quality colour pastes. Further, the invention solves the long standing problem of skin formation in alkyd resin-containing colour pastes according to the invention by finding effective agents against skin formation.

Colour pastes according to the invention, and especially those containing at least one agent against skin formation, have the additional, special advantage that the critical pigment-volume concentration is very high so that the total porosity (=1– CPVC/PVC where CPVC stands for the critical pigment-volume concentration and PVC stands for the pigment-volume concentration—see Paint Flow and Pigment Dispersion, ed. Temple C. Patton. 2nd ed. 19 . . . , pages 126–129) is very low after drying. Stoving faults can thus to a large extent be avoided.

The invention is illustrated by the following Examples.

EXAMPLES 1 to 10

The composition of the printing media for colour pastes is shown in Table 1. To prepare the media, the raw materials are mixed and dissolved in a dispersing apparatus (dissolver) in 20 minutes without cooling.

TABLE 1

| | Printing medium for colour pastes (composition in % by weight) | | | | |
|---|---|---|---|---|---|
| Example No. | 1 | 2 | 3 | 4 | 5 |
| Solvent system: isoparaffin Type/% by weight 1) | M/73 | M/70 | L/72 | M/67 | J/67 |
| Plasticiser Type/% by weight 2) | | | | DOP/6 | DOP/6 |
| Binder system: Acrylic resin Type/% by weight 3) | EC1/15 | PQ610/18 | EC1/18 | EC1/15 | EC1/15 |
| alkyd resin Type/% by weight 4) | AL810/12 | AL810/12 | AL810/10 | AL810/10 | AL810/10 |

TABLE 1-continued

| Printing medium for colour pastes (composition in % by weight) | | |
|---|---|---|
| Processing auxiliaries defoamer 5) % by weight | 1 | 1 |
| dispersing agent 6) % by weight | 1 | 1 |

1) Isopar$^R$/Exkon Chemical Type L: boiling range 190–207° C.; Type J; 182–208° C.; 92 209 KF Type M: 205–255° C.
2) DOP = dioctyl phthalate; DBS = dibutylsebacate
3) Plioway$^R$/Goodyear. Type EC-1 and EC-T are terpolymers of i-butylmethacrylate, vinyl toluene and 2-ethylhexylacrylate Plexiqum$^R$Röhm, type PQ 610 based on butyl methacrylate
4) Alftalat/Hoechst AG, Type AL 810
5) Tegoflow 700/Tegochemie, Essen
6) Hypermer LP 8/ICI:polyhydroxyfatty acid amide

| 5 | 6 | 7 | 8 | 9 | 10 |
|---|---|---|---|---|---|
| J/67 | M/48 | M/67 | M/58 | M/72 | M/61 |
| DOP/6 | DOP/10 | DBS/6 | DOP/15 | DOP/6 | DOP/10 |
| EC1/15 | EC1/30 | EC1/15 | ECT/15 | PQ610/20 | EC1/27 |
| AL810/10 | AL810/10 | AL810/10 | AL810/10 | — | — |
| 1 | 1 | 1 | 1 | 1 | 1 |
| 1 | 1 | 1 | 1 | 1 | 1 |

EXAMPLE 11

Skin formation of the printing medium of Example 4 inside a closed vessel containing a layer of air and in particular skin formation of the colour paste produced therefrom, which has a solids content of decorating colour of 83% by weight, is prevented for more than 2 weeks by the addition of 1 g of methylethyl ketoneoxime to 100 g of the printing medium.

EXAMPLES 12 to 15

The decorating colour (type 14215, Degussa AG) consisting of a black pigment based on a Cr/Cu/Fe oxide and a lead boron silicate frit is mixed with a medium and an antiskinning agent (antioxidant) and dispersed to result in the colour pastes (Table).

TABLE 2

Colour pastes (composition in % by weight)

| Example No. | Decorating colour (%) | Medium Type according to Example No. | (%) | Antiskinning agent *) |
|---|---|---|---|---|
| 12 | 83.3 | 4 | 15.7 | 1 |
| 13 | 58.7 | 6 | 40.3 | 1 |
| 14 | 78.1 | 8 | 20.9 | 1 |
| 15 | 84.3 | 7 | 14.7 | 1 |
| 16 | 74.3 | 10 | 25.7 | 1 |

*) The antiskinning agent used was a commercial antioxidant based on sterically hindered phenols.

If necessary, the printing viscosity is adjusted by the addition of isoparaffin (Isopar M). The colour pastes are almost odourless, form no skin even over a period of serveral weeks and have a high covering power of the decoration.

We claim:

1. A colour paste suitable for stoving at 500° to 1400° C. and for the production of decorations on surfaces of glass, porcelain or ceramic, consisting essentially of (a) at least one colour producing inorganic components selected from the group consisting of storing stable pigments and colour frits, (b) from 10 to 25% by weight of a printing medium comprising a (polymeric organic binder system dissolved as a clear solution or a gel in an organic solvent system,) wherein the solvent system contains at least 70 to 100% by weight of at least one isoparaffin having a boiling point in the range of from above 150° to 250° C., from 0 to 30% by weight of at least one solvating plasticiser and from 0 to 30% by weight of at least one solvent selected from the group consisting of alcohols, ethers, esters and ketches, (c) a glass flux, and (d) up to 10% by weight of conventional processing auxiliaries, the solids content of the colour paste being above 70% by weight.

2. A colour paste according to claim 1 wherein the glass flux is at least one glass frit.

3. A printing medium for the production of a colour paste according to claim 1, comprising a polymeric organic binder system dissolved as a clear solution or a gel in an organic solvent system, wherein the solvent system consists essentially of at least 70 to 100% by weight of at least one isoparaffin having a boiling point in the range of from above 150° to 250° C., from 0 to 30% by weight of at least one solvating plasticiser and from 0 to 30% by weight of at least one solvent selected from the group consisting of alcohols, ethers, esters and ketones and wherein the binder system contains at least one modified alkyd resin and one or more homo- and/or copolymer of $(C_3-C_2)$-acrylates, and in addition there is present 0.005 to 2% by weight of an antiskinning agent selected from the group consisting of ketoximes or aldoximes containing 3 to 6 carbon atoms and conventional anti-oxidants for polymer systems.

4. A color paste according to claim 1 additionally containing 0.005 to 2% by weight of an antiskinning agent selected from the group consisting of aldoximes or ketoximes containing 3 to 6 carbon atoms and conventional antioxidants for polymer systems.

5. A colour paste according to claim 1, wherein the binder system consists of at least one polymer said polymers being compatible with one another and which dissolve in the solvent system to form clear solutions or gels and being selected from the group consisting of homo- and copolymers of $(C_3-C_2)$-alkyl methacrylates, $(C_3-C_{12})$-alkyl acrylates, styrene, vinyl toluene, vinyl acrylate, 2-ethylhexene, polyolefins, cyclorubber, hydrocarbon resins, and modified alkyl resins.

6. A colour paste according to claim 5, wherein the binder system contains at least one modified alkyd resin and at least one homo- and/or copolymer of $(C_3-C_{12})$-alkyl methacrylates and/or $(C_3-C_{12})$-alkyl acrylates, and in addition there is present 0.005 to 2% by weight of an antiskinning agent selected from the group consisting of aldoximes or ketoximes containing 3 to 6 carbon atoms and conventional antioxidants for polymer systems.

* * * * *